United States Patent [19]
Walton

[11] 4,365,122
[45] Dec. 21, 1982

[54] MACHINE CONTROL DEVICE

[76] Inventor: Russell C. Walton, 106 Center Ave., Libertyville, Ill. 60048

[21] Appl. No.: 44,651

[22] Filed: Jun. 1, 1979

[51] Int. Cl.³ .......................... H01H 3/16; F16D 9/00
[52] U.S. Cl. ............................................... 200/61.42
[58] Field of Search .............. 200/18, 61.42, 61.58 R; 192/129 A, 130, 132, 134

[56] References Cited
U.S. PATENT DOCUMENTS

| | | | |
|---|---|---|---|
| 3,315,049 | 4/1967 | Cain | 200/61.42 |
| 3,487,182 | 12/1969 | Grundy | 200/61.42 |
| 3,496,315 | 2/1970 | Giese, Jr. et al. | 335/69 |
| 3,939,314 | 2/1976 | Loeser | 200/61.42 |

*Primary Examiner*—James R. Scott
*Attorney, Agent, or Firm*—Robert O'Neill

[57] ABSTRACT

An improved machine control for sensing an obstruction in the path of a machine tool and preventing movement of the tool along its path. A sensor is mounted on a movable support rod and adjustably positioned to move along a path coaxial with the path of the tool in order to sense any obstruction in a work area. The movable support rod is constructed to allow gravity fall of the sensor into the work area and to cause actuation of a switching circuit allowing machine tool movement if no obstructions are sensed. A spring-biased arm coupled to a rotary solenoid retains the movable support rod in a rest position. Upon actuation, the solenoid rotates the arm so that gravity causes the support rod to fall and the sensor to move into the work area. The elements of the machine control are mounted to a plate which may be removably attached to various types of machines.

13 Claims, 10 Drawing Figures

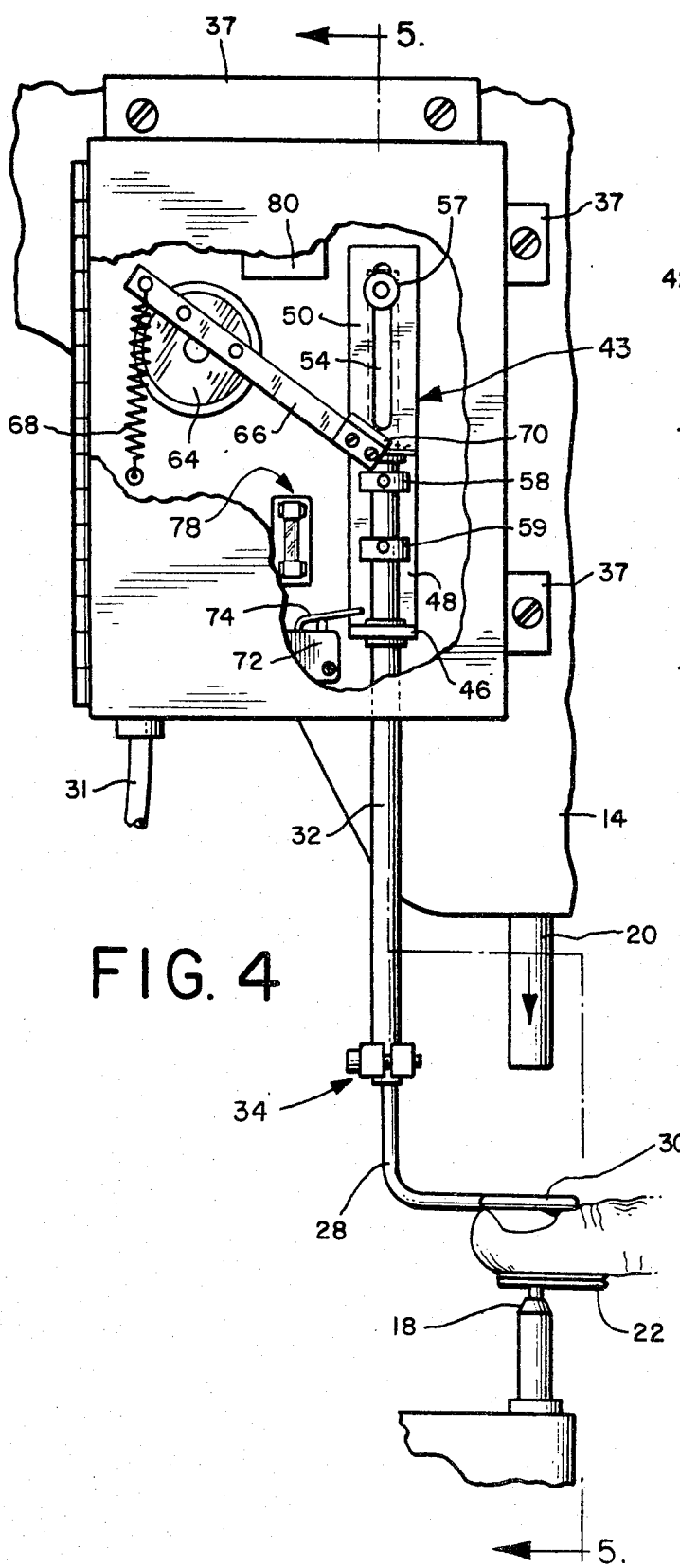
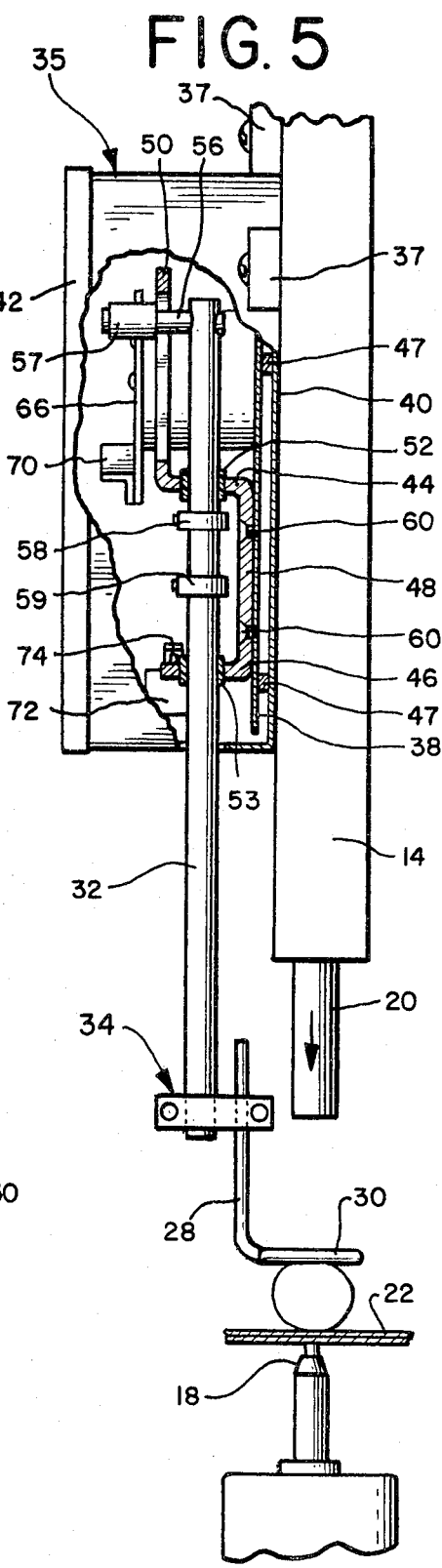

MACHINE CONTROL DEVICE

BACKGROUND OF THE INVENTION

The present invention relates to improvements in machine controls and more particularly, to a mechanism for sensing obstructions in the tool path of machines used for welding, pressing, riveting and the like.

In spite of the increased complexity and trend toward automation of many machine processes, certain control devices are still required to reduce the danger to machine operators and to prevent damage to expensive machines from improper operation. While various types of devices are known, each generally employs a sensor which is introduced into a work area prior to the intitiation of machine tool movement. The movement of the sensor is intiated by the operator or by automatic control, but movement of the machine tool is conditioned upon the sensor not encountering any obstructions in the work area. In this manner, operator error and automatic controls cannot cause initiation of machine tool movement when obstructions may cause an unsafe condition in the work area.

In spite of the variety, prior art devices tend to be constructed for use in connection with a specific machine, thereby limiting their usefulness with many different machines. In addition, the devices have been constructed with numerous special parts and complex mechanical arrangements which increase the cost and repair time of each mechanism. As a result, their use decreases the efficiency of machine operation and encourages their bypass or elimination in order to continue machine operation. Since a primary concern is for operator safety, it is highly desirable to employ devices which will operate effectively for long periods of time as well as discourage and prohibit operation of a machine in an unsafe condition.

In one particular example shown by U.S. Pat. No. 3,487,182 to Grundy, a device is shown which employs a movable rod supporting a sensor which in turn moves coaxially along the path of machine tool movement. A plurality of guide blocks and special support configurations are used to position the sensor while additional elements are required to control the rate of gravity fall of the sensor into the work area. In addition, a special spring-yoke lever mechanism, directly connected to one end of the rod, is used to position and release the sensor. While the device appears to provide for effective sensing of obstructions and subsequent machine tool control, its complexity increases the likelihood of malfunction and decreases its versatility for use with a variety of machines.

Accordingly, the present invention has been developed to overcome the specific shortcomings of the above known and similar techniques, and to provide a less complex mechanism for controlling machine tool operation.

SUMMARY OF THE INVENTION

It is therefore a feature of the invention to provide a machine control which is simple and inexpensive in construction and readily adaptable for use with a variety of machines.

Another feature of the invention is to provide a machine control which employs a simple guide for controlling the position of a sensor in a work area.

A further feature of the invention is to provide a machine control which employs a sensor that may be readily adjusted to accommodate various operating conditions.

Still another feature of the invention is to provide a machine control which is less subject to wear and which facilitates easy removal and replacement for repair.

A still further feature of the invention is to provide a machine control which initiates machine tool movement in response to sensor position.

Yet another feature of the invention is to provide a machine control which employs a spring-biased arm activated by a rotary solenoid to control gravity fall of the sensor.

These and other features are provided by adjustably coupling a sensor to a movable support rod guided for movement along a path generally parallel to the path of machine tool movement. In one embodiment, a simple guide is mounted to a backing plate which is removably attached to a machine. The guide controls the movement of the support rod and the associated sensor in the work area. A roller projecting from the rod is coupled to engage a spring-biased arm mounted for rotation to a rotary solenoid attached to the backing plate. In its rest position, one end of the arm engages the roller to retain the sensor in a position removed from the workpiece. Upon activation, the solenoid rotates the arm from under the roller allowing the rod and sensor to fall by gravity into a work area. An adjustable collar located on the rod activates a switch connected to the backing plate if no obstructions are encountered in the work area. The switch, in turn, energizes a relay mounted on the backing plate to control movement of the machine tool. The backing plate and all associated parts are positioned within an enclosure on the machine and may be removed for easy repair and replacement as a unit.

In an alternative embodiment, the backing plate is constructed as the guide for the rod and includes a mounting bracket removably attached thereto. The mounting bracket may be easily changed to allow attachment of the device to a variety of machines.

Other advantages and novel features of the invention will become apparent from the following detailed description of the invention when considered with the accompanying drawing wherein:

BRIEF DESCRIPTION OF THE DRAWINGS

FIG. 4 is a fragmentary side view of the device shown in FIG. 1 illustrating the position of the elements when an obstruction is encountered.

FIG. 5 is a fragmentary cross-sectional view taken along the line 5—5 in FIG. 4.

DESCRIPTION OF PREFERRED EMBODIMENTS

Figure 1:
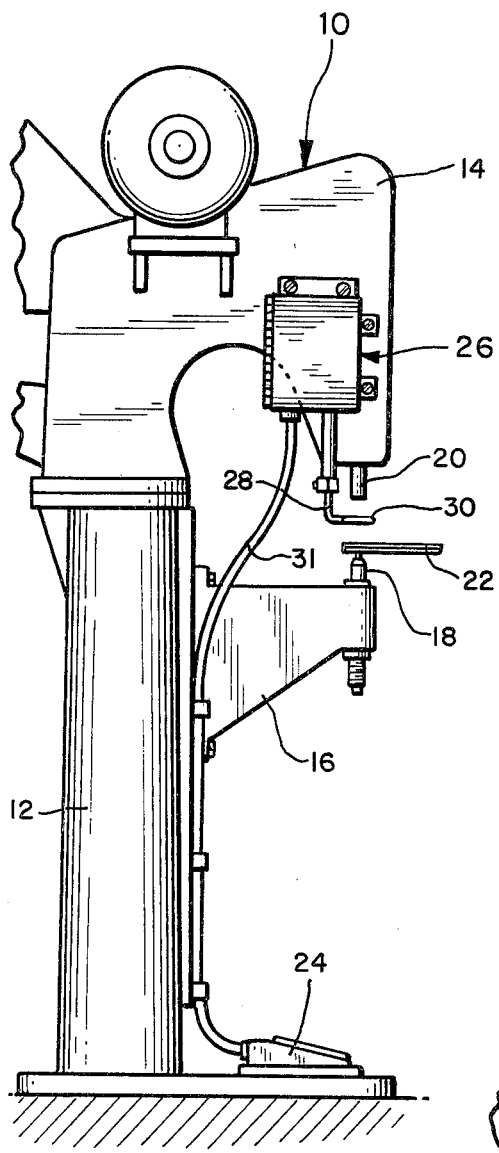
FIG. 1 is a fragmentary side view of a machine utilizing one embodiment of the control device of the present invention.

Referring now to the drawings, wherein like numerals are used to designate like elements throughout, FIG. 1 generally shows a machine 10 having a base portion 12 on which is mounted a head portion 14 and a support bed 16. The machine 10, which could be a punch press, welder, or any other similar prior art device, employs a stationary tool 18 held by the support 16, and a movable tool 20 coaxially aligned above the stationary tool 18. The machine 10 is normally operated to cause movement of the tool 20 linearly along a path towards the workpiece 22 by a foot switch 24 when a machine control is not employed. The specific operation and construction of machines of this type are well known and will therefore not be described in any more detail than is necessary to facilitate an understanding of its cooperation with the invention.

In accordance with one embodiment of the invention, a machine control 26, having a sensor extending into the work area, is attached to the head portion 14 to allow for detection of obstructions in the work area between the tools 18 and 20. As is more particularly shown in FIGS. 2, 4 and 5, the device 26 includes a sensor generally formed by a vertical rod 28 terminating in a loop 30 which extends angularly from the rod 28. The loop 30 has an axis through its center which is coaxial to the path of the movement of the tool 20. The sensor is located so that movement of the loop along its axis will be prevented when any obstruction appears between the tools 18 and 20.

Figure 3:
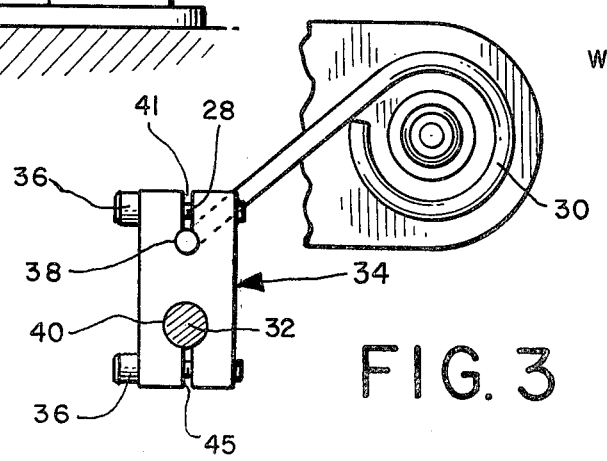
FIG. 3 is a cross-sectional view taken along the line 3—3 in FIG. 2.

With reference to FIG. 3, the sensor is adjustably connected to a movable support rod 32 by frictional retention in split-block 34. The block 34 includes channels 38 and 40 receiving rods 28 and 32, respectively, for maintaining the rods substantially parallel to one another. The block 34 includes slots 41 and 45 cut through the block along the length of the channels and fasteners 36 extending through one side of the block generally perpendicular across the slots and threaded into the other side of the block. The cooperation of the fasteners 36 and the slotted portions of the block, allows frictional engagement of block 34 at any desirable position along the length of each rod 28 and 32. As a result, the position of the loop sensor 30 can be vertically adjusted along its axis in relation to the tools 18 and 20 and horizontally adjusted by rotation of shaft 28 in its channel in block 34.

Figure 2:
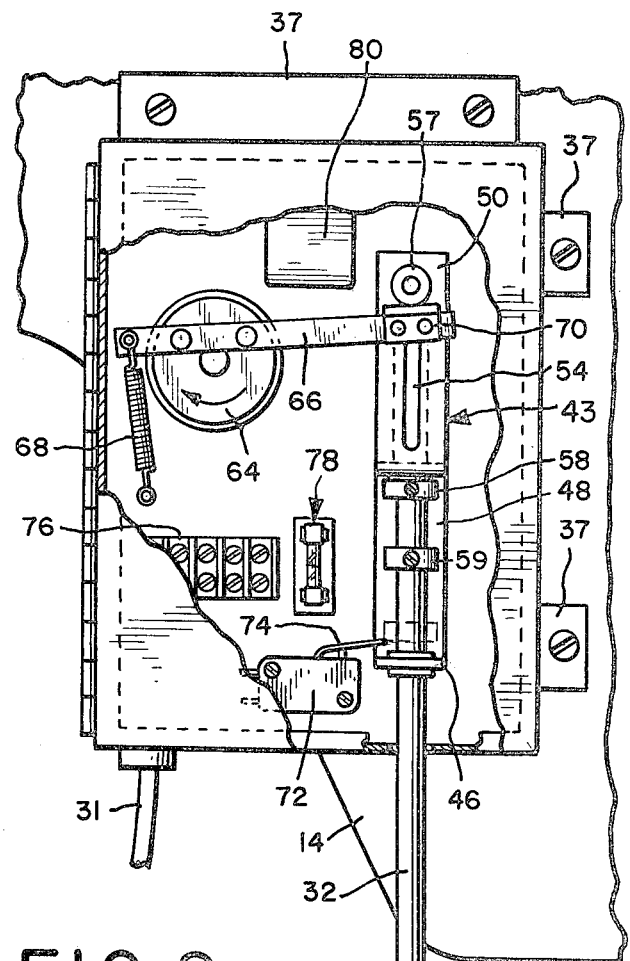
FIG. 2 is a detail fragmentary side view of the device shown in FIG. 1.

Referring now to FIGS. 2 and 5, the elements of the control device are shown attached to a plate 38 which is removably mounted to spacing projections 47 extending from the vertical wall 40 of enclosure 35 and spacing the plate 38 so that it is generally parallel to the wall 40. Access to and removal of the plate 38 from enclosure 35 is provided by a hinged cover 42. The support rod 32 extends through a hole in the enclosure which is mounted on head 14 in a conventional manner by brackets and fasteners 37. A guide bracket 43 is attached to the plate 38 by fasteners 60 and positioned to guide the vertical movement of the support rod 32. The guide is constructed to have two opposing parallel plate members 44 and 46 connected by a third plate member 48 extending orthogonally therebetween. A fourth plate member 50 extends orthogonally from the opposite end of the member 44 in a vertical direction parallel to the plate member 48. Plate members 44 and 46 have vertically aligned openings extending therethrough which retain bearing members 52 and 53. Member 50 has a slot 54 extending along its length parallel to an axis through the center of bearing members 52 and 53. The support rod 32 is slidably retained by the bearing members to allow movement of the rod vertically through said members generally parallel to plate 38. In addition, the support rod has an angularly projecting rod 56 extending through the slot 54 which retains a horizontally disposed roller 57 thereon. The rod 56 is slidably retained by the slot 54 to prevent rotation of rod 32 and accurately control movement of sensor 30.

Collars 58 and 59 are disposed along a portion of the rod 32 extending between the bearing members 52 and 53. The collars may be fixed at any position on the rod between the members 52 and 53 by conventional set screw engagement. For this purpose, a flat surface may be formed along the length of a portion of the rod 32 to improve seating of the set screws on the rod. By controlling the vertical position of the collars along the identified portion of the rod 32, the stroke or range of movement of the support rod, and therefore the attached sensor, can be adjustably controlled.

A rotary solenoid 64 is attached to the base plate 38 and supports an arm 66 extending parallel to the base plate 38. One end of the arm 66 is attached to a spring 68 which in turn is attached to the base plate 38 in any conventional manner. The opposite end of the arm 66 has an angular member 70 attached thereto which provides a flat surface for engagement with the roller 57. The solenoid, arm and spring arrangement are positioned on the backing plate 38 in relation to the guide so that the spring 68 normally biases a surface of member 70 against the roller 57 to maintain the support rod in a position fixed by adjustment of the upper collar 58 when it abuts against upper bearing 52. When activated, the rotary solenoid rotates the arm 66 against the spring bias so that the surface of element 70 moves downwardly away from the roller 57 allowing the rod 32 to fall by the force of gravity.

A limit switch 72 is also mounted to the plate 38 and includes a switch arm 74 which closes the switch contacts when depressed. In the configuration shown, the switch arm 74 is positioned in the path of the lower collar 59 so that when the collar reaches a set position, following movement of the rod 32, the switch arm will be depressed by the collar and close the contacts of the switch 72.

Figure 6:
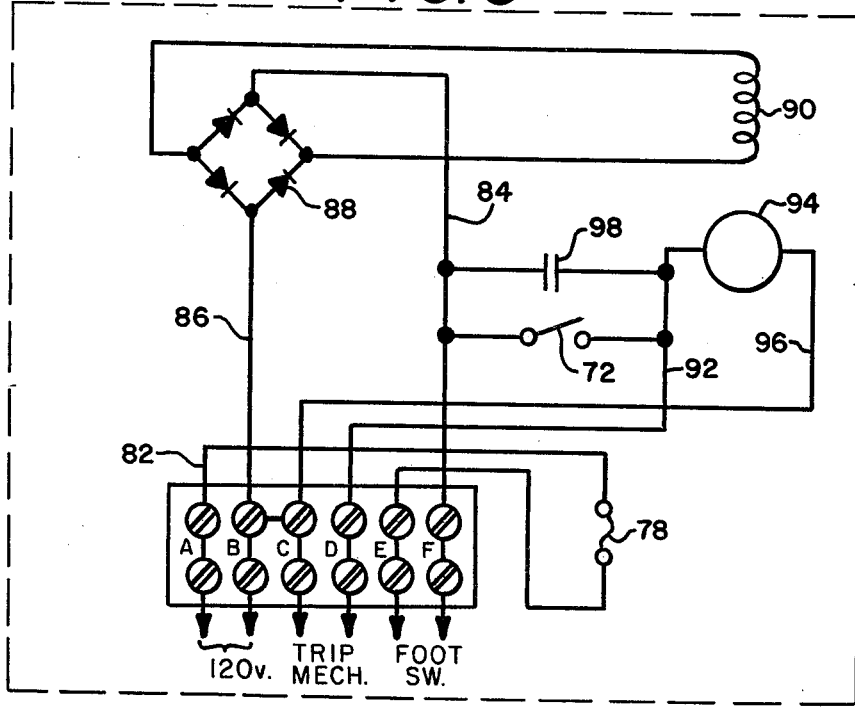
FIG. 6 is a schematic diagram of the wiring and control circuitry for the device of FIGS. 1-5.

Referring again to FIG. 2, a connector block 76, fuse and holder 78, and relay 80 are also attached to the base plate 38 and are connected to provide the electrical circuitry needed to cause movement of the tool 20 when no obstructions are detected by the sensor 30. As shown in FIG. 6, the connector block receives power at terminals A and B which in the present example is a conventional 120 v alternating current two wire source. The output leads from foot switch 24 are connected via cable 31 to terminals E and F. Terminals C and D provide an output which may be coupled to any conventional mechanism for initiating movement of the machine tool 20. Terminal A is coupled, via line 82, through fuse 78 and foot switch 24, via terminals E and F, to line 84. Terminal B is coupled to terminal C and to line 86. Lines 84 and 86 then provide 120 v bias to a conventional full wave rectifier 88 upon closure of foot switch 24. The output of the rectifier 88 is coupled to coil 90 which causes rotary solenoid 64 to move arm 66 and element 70 from under the roller by clockwise rotation. Limit switch 72 has one terminal connected to line 84, and the other connected to terminal D through line 92. A relay 94 has one terminal connected to line 92 and the other to terminal C through line 96. In addition, normally open relay contacts 98, operated by relay 94, are coupled between lines 84 and 92.

The operation of the control device will now be described with particular reference to FIGS. 2, 4 and 6. Initially, the device 26 is attached to the machine head 14 in order to allow positioning of the sensor between the tools 18 and 20. At the same time, the terminals from foot switch 24 are coupled via cable 31 to connector block 76 in the manner described. The outputs from terminals C and D on the connector block are coupled to the appropriate device for activating the tool 20. Adjustments of the sensor height and horizontal position may be made by movement of collars 58 and 59 and block 34 as has been previously described. Prior to depression of the foot switch 24, the bias of spring 68 holds the arm so that the surface of element 70 bears against roller 57 and holds the sensor in a position removed from the workpiece 22 fixed by adjustment of collar 58 abutting against upper bearing 52. In order to start the operation, foot switch 24 is depressed to apply power through the connector block to rectifier 88 and coil 90 and cause clockwise rotation of the arm 66. As the arm 66 moves by rotation, the surface of element 70 moves down followed by roller 57 remaining in contact therewith allowing rod 32 and sensor 30 to move vertically downward under the force of gravity. If no obstructions are encountered, the sensor descends to a point very near the surface of the workpiece 22 at which time collar 59 contacts switch arm 74 causing closure of the contacts of switch 72. Lower bearing 53 then limits further movement of the rod 32 when collar 59 moves into contact with it. As can be noted, the spacing allowed between the sensor 30 and workpiece 22 can be adjusted by the position of lower collar 59 to accommodate various size workpieces and still provide the sensing of obstructions.

When the contacts of switch 72 close, power is applied to terminals C and D and to relay 94 via lines 84 and 96 causing the relay to close its normally open contacts 98. At this time, the relay 94 becomes locked in circuit causing power to remain coupled to terminals C and D for activation of the tool 20. Once contacts 98 are closed, power will be applied to move tool 20 so long as foot switch 24 is depressed regardless of the status of the contacts of switch 72. Thus, the circuit provides for the application of only one power pulse under the control of foot switch 24 even if the sensor bounces or otherwise causes the limit switch contacts to open after a detection of no obstruction. Upon complation of the operation, foot switch 24 is released by the operator and spring 68 causes arm 66 to return the sensor to its initial position by rotation of the unactivated solenoid 64 in a counterclockwise direction.

Turning now to FIG. 4, if an obstruction, such as an operator's finger or hand or any other impediment, prevents the fall of the sensor to a position near the surface of workpiece 22, the collar 59 will not be able to move to depress switch arm 74 even though arm 66 continues to rotate. In this instance, the contact of switch 72 will not be closed and no power will be applied to relay 94 to enable application of power to terminals C and D. Thus, so long as an obstruction is in the path of the tool 20, tool movement will be prohibited.

Once the obstruction is removed, however, the sensor will again be able to fall to the surface of the workpiece allowing collar 59 to depress switch arm 74 and closing the contacts of switch 72 to initiate machine tool movement as has been previously described.

Figure 7:
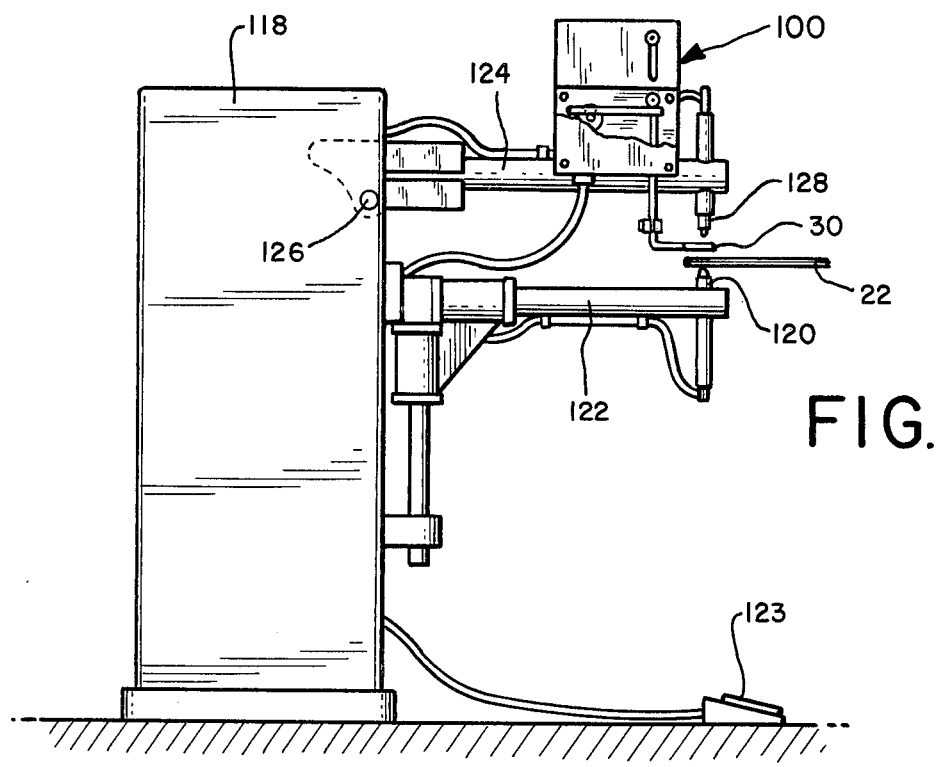
FIG. 7 is a side view of a machine using another embodiment of the control deivce of the present invention.
Figure 8:
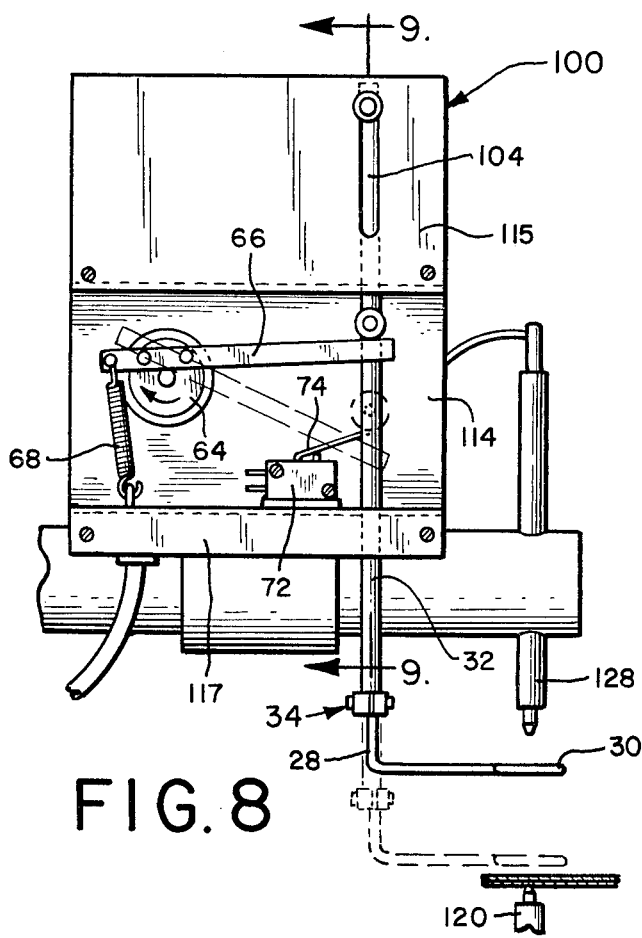
FIG. 8 is a detailed fragmentary side view of the device shown in FIG. 7.
Figure 9:
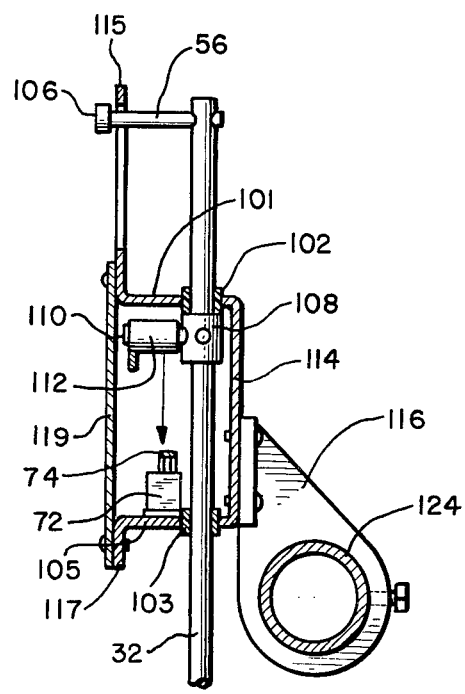
FIG. 9 is a cross-sectional view taken along the line 9—9 in FIG. 8.

Referring now to FIGS. 7-9, an alternative embodiment of the control device is shown which facilitates use of the device with a variety of machines. Since both embodiments operate in substantially the same manner, only the differences will be explained in detail, it being readily apparent that the configuration and operation of common elements may be easily understood by reference to the embodiment of FIGS. 1-6. In this embodiment, the back plate 38 is replaced by a guide plate 100 having a configuration similar to the guide bracket of the previously described embodiment. The guide plate 100 has two opposed parallel planar members 101 and 105 connected by an orthogonal planar member 114 to form a generally u-shaped trough. Another planar member 115, spaced horizontally from the member 114 and positioned parallel thereto, extends orthogonally from an edge of member 101. Still another planar member 117, lying the same plane as member 115, extends orthogonally from an edge of member 105. A cover plate 119 may be secured to member 115 and 117 to cover the elements attached to member 114 within the trough. Vertically aligned openings are located in members 101 and 105 and retain bearings 102 and 103. The bearings slidably retain rod 32 for movement parallel to member 114.

The upper end of rod 32 has a shaft 56 angularly extending through a vertically extending slot 104 in member 115 to accurately control movement of rod 32 and the position of sensor 30 during gravity fall. The rod 56 may include a collar 106 at its end. In contrast to collars 58 and 59 in the previously described embodiment, a single collar 108 is positioned on the rod 32 between bearings 102 and 103 and adjustably secured by a set screw in a manner similar to that previously described. The collar 108 has an arm 110 extending perpendicularly thereto and a roller 112 horizontally disposed on the arm. The solenoid 64, arm 66, and bias spring 68 are mounted on one surface of the member 114 in a manner similar to that described with reference to FIGS. 1-5. In this instance, however, the limit switch 72 is mounted to the member 114 so that the switch arm 74 is depressed by a portion of roller 112 when the sensor falls to its desired position within the work area. Adjustment of the position of the collar 108 on the rod 32 limits the stroke of the sensor 30. A mounting bracket 116 is removably attached to the back plate 114 and is configured to allow attachment to a particular machine. By selecting a bracket 116 with a suitable configuration, the safety device may be mounted to a variety of machines with only a simple bracket change.

In the present example, the control device is shown mounted to a conventional welding machine 118 in FIG. 7. The welder has a stationary support arm 122 carrying a lower electrode 120 and an upper support arm 124 pivotally mounted to the welder at 126 and carrying an upper electrode 128 vertically aligned above the electrode 120. When conventionally activated by foot switch 123, the arm is caused to move down to cause engagement of the workpiece 22 between the electrodes prior to initiation of welding current.

Figure 10:
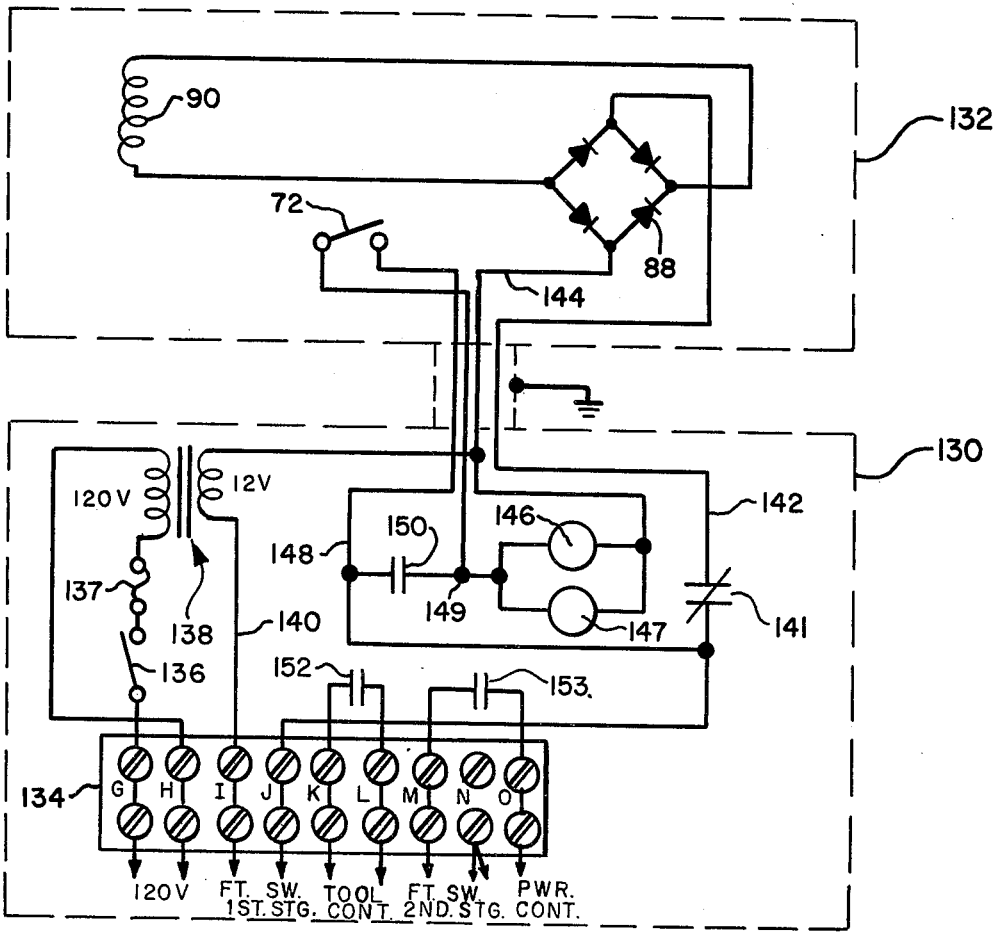
FIG. 10 is a schematic diagram of the wiring and control circuitry for the device of FIGS. 6–9.

In accordance with the present embodiment, however, the circuitry used to initiate electrode movement when employed with the control device is shown by FIG. 10. In this diagram, the circuitry shown in block 130 is normally included on the welding machine while the circuitry shown in block 132 is attached to the plate 100. In the present example, a terminal block 134 has its terminals G and H connected to receive power from a conventional source of 120 v alternating current. Foot switch 123, in the present example, is constructed as a two-stage switch wherein the first stage is closed by depressing a pedal on foot switch 123 by a predetermined amount, and the second stage is sequentially closed when the pedal is depressed a further amount. The leads from the first stage of foot switch 123 are coupled to terminal I and J while the leads from the second stage are coupled to terminals M and N. Terminals K and L are coupled to a conventional welder tool control designed to supply power for movement of the arm 124 when normally open relay contact 152, coupled between terminals K and L is closed. Terminals N and O are coupled to a power control in the welder to supply welding current to electrodes 120 and 128 when the second stage switch of foot switch 123 is closed and the normally open relay contact 153, coupled between terminals M and O, is closed. Relay contacts 152 and 153 (operated by relay 147) are closed when relay 147 receives power as will subsequently be described.

A power switch 136 applies current from terminals G and H through fuse 137 to the primary windings of transformer 138. One output of the secondary is coupled via line 140 to terminals I and J through the first stage switch of foot switch 123 and then to full wave rectifier 88 via normally closed relay contacts 141 (operated by relay 146) and line 142. The other output of the secondary is connected to the second input to the full wave rectifier 88 via line 144. The output of the rectifier 88 is then coupled to provide power to coil 90 to drive the rotary solenoid. One terminal of the limit switch 72 is coupled to one terminal of each relay 146 and 147 at the junction 149. The other terminal of switch 72 is coupled to terminal J via line 148. The other terminals of each relay 146 and 147 are coupled to line 144. Normally open relay contact 150 (operated by relay 146) is coupled between the junction 149 and line 148. When relays 146 and 147 receive power, relay contacts 150, 152 and 153 close and relay contact 141 opens.

In the present embodiment, when the pedal of foot switch 123 is depressed to a position sufficient to close the first stage switch, voltage is supplied to rectifier 88. The output voltage at 88 energizes coil 90 causing rotation of solenoid 64 and clockwise rotation (FIG. 8) of arm 66 beneath roller 112. Gravity causes the roller 112 to remain in contact with the arm 66 as it moves while the sensor descends into the work area. If no obstructions are encountered by the sensor, a portion of roller 112 depresses switch arm 74 closing the contacts of switch 72 and applying power to relays 146 and 147. At that time, relay contact 150 closes to lock relays 146 and 147 in the power circuit. At the same time, relay contacts 152 and 153 close and contact 141 opens. The closure of relay contact 152 causes power to be applied to a welder tool control to initiate movement of the arm 124. In the event that an obstruction is encountered by the sensor, roller 112 will not depress switch arm 74 and the open contacts of switch 72 will prevent energization of relays 146 and 147 until the obstruction is removed. Once the switch 72 has been closed, however, and relay contacts 141 opened by energization of relay 146, power to solenoid winding 90 is cut off allowing the spring bias arm 66 to return the rod 32 to its initial position. Welding current is then applied to the electrode 120 and 128 by a further depression of foot switch 123 to cause closure of the second stage switch. As is apparent, once the relays 146 and 147 have been energized and locked in circuit, movement of the sensor will not cause interruption of the machine process. In addition, since the limit switch 72 and rectifier 88 are the only circuit elements mounted to the plate 100, the machine control device is simplified and readily adaptable to the control circuitry of a variety of machines.

As can be seen from the above description, the present invention provides a machine control device which is simple in construction and operation and which may be effectively employed to sense obstructions in the path of machine tools. In one instance, the use of a removable plate to mount the elements of the control device within an enclosure allows the device to be easily repaired. The plate may be removed for repair and replacement of parts while another plate is substituted to continue machine operation. This increases the efficiency of the machine by minimizing its period of inactivity and discourages any tendency to bypass or eliminate such device. In addition, since all elements are constructed from readily available stock, there is no need for specially fabricated components or circuits. Further, the use of the arm supported by the rotary solenoid to control gravity fall of the support rod reduces the complexity of the mechanical arrangement for controlling sensor movement and lessens the wear that is normally encountered in other complex mechanical assemblies. The particular guide structure also simplifies control of sensor movement and positioning and reduces the likelihood of sensor misalignment or malfunction. In contrast to prior systems, the present device, by use of the locking relay circuit, also prevents interruption of machine operation by inadvertent or intentional movement of the sensor once the work area has been sensed clear of any obstructions. Finally, by use of a simple guide plate formed as an integral structure by stamping, pressing or the like, the construction of the control device is simplified, decreasing its cost while increasing its versatility.

Obviously, many modifications and variations of the present invention are possible in light of the above teachings. It is therefore to be understood that within the scope of the appended claims the invention may be practiced otherwise than as specifically described.

I claim:

1. A machine control device comprising:
   a movable support rod;
   a sensor coupled to said movable support rod, said sensor and rod being movable by the force of gravity;
   a plate having means attached thereto for slidably retaining said support rod;
   a limit switch coupled to said plate;
   means coupled to said rod for closing said limit switch;
   means extending from said rod;
   a movable arm having one end positioned in contact with and beneath said extending means;
   means coupled to said plate and to said arm for biasing said arm in an upper position; and
   rotary solenoid means coupled to said plate and to said arm for moving said arm beneath the extending means in a downward direction against the bias of said biasing means, said extending means being held in contact with the one end of said arm solely by the force of gravity when said arm is moved in the downward direction.

2. A machine control device for controlling the movement of a machine tool along a path comprising:
a movable support rod;
a sensor coupled to said movable support rod, said sensor and rod being movable by the force of gravity;
a base plate having means coupled thereto for slidably retaining said support rod for movement along an axis;
a limit switch coupled to said base plate for controlling machine tool movement when closed;
means coupled to said support rod for closing said limit switch during movement of the rod along said axis, said closing means closing said limit switch during said movement if no obstructions are encountered by the sensor during its movement when positioned to move along the path of a machine tool;
means extending from said support rod;
a movable arm having one end positioned in contact with and beneath said extending means so that said extending means rests thereon only by the force of gravity;
means coupled to said base plate and said arm for biasing said arm against the force of gravity;
rotary solenoid means coupled to said base plate and said arm for rotating said arm downward beneath the extending means and against the bias of said means for biasing so that said rod and sensor move along said axis by the force of gravity as said extending means moves downward with said arm;
an enclosure; and
means removably coupling said base plate within said enclosure, said support rod extending through said enclosure to position said sensor outside the enclosure.

3. The device of claim 2 wherein said means for slidably retaining said support rod includes a guide bracket removably attached to said base plate, said guide bracket having two spaced apart bearings attached thereto for slidably retaining said support rod, said guide bracket further including a slot slidably retaining said extending means for guiding said sensor during movement of said support rod along the axis.

4. A device of claim 3 wherein two collars are adjustably attached to a portion of said rod between said bearings, one of said collars being coupled to limit upward movement of the rod by abutment against an upper one of said bearings and the other of said collars being coupled to form the means for closing said limit switch during gravity fall of the support rod and attached to limit the downward movement of said rod by abutment against a lower one of said bearings.

5. The device of claim 2 further including means responsive to the closure of said limit switch for controlling machine tool movement, said responsive means including,
a relay attached to said base plate, a relay latching switch coupled to be closed upon actuation of the relay, and a connector block means coupled to said base plate for providing couplings upon closure of said limit switch to actuate and latch said relay and control machine tool movement; and switch means coupled to said connector block means for energizing said rotary solenoid means so that it rotates said arm downward beneath the extending means.

6. A device of claim 2 wherein said extending means includes a roller coupled to said rod and further wherein a member having a flat surface is attached to said arm and positioned beneath said roller, said roller being held in contact with said surface by the force of gravity.

7. A machine control device for controlling the movement of a machine tool along a path comprising:
a movable support rod;
a sensor coupled to said movable support rod, said sensor and rod being movable by the force of gravity;
a guide plate slidably retaining said support rod for movement along an axis;
a limit switch coupled to said guide plate for controlling machine tool movement when closed;
means extending from said rod for closing said limit switch during movement of the rod along said axis, said extending means closing said limit switch during said rod movement if no obstructions are encountered by said sensor during its movement when positioned to move along the path of a machine tool;
a movable arm having one end positioned beneath said extending means so that said extending means rests thereon only by the force of gravity;
means biasing said arm against the force of gravity; and
rotary solenoid means coupled to said guide plate and said arm for rotating said arm downward beneath the extending means and against the bias of said means for biasing so that said rod and sensor move along said axis by the force of gravity as said extending means moves downward with said arm.

8. The device of claim 7 further including means coupled to said guide plate for removably mounting said guide plate to a machine.

9. The device of claim 8 further including a slot in said guide plate and means projecting from said support rod and slidably retained by said slot for guiding the sensor during movement of the support rod along said axis.

10. The device of claim 8 wherein said guide plate includes two spaced apart bearings attached thereto for slidably retaining said support rod and wherein said extending means includes a collar adjustably attached to a portion of said support rod between said bearings and a roller coupled to said collar and resting on the one end of said movable arm.

11. The device of claim 8 wherein said sensor is adjustably coupled to said support rod by a split-block having two channels frictionally retaining said rod and said sensor.

12. The device of claim 8 further including means responsive to closure of said limit switch for providing power to initiate machine tool movement, said responsive means including a relay having contacts coupled to lock power to the relay and couple power to initiate machine tool movement.

13. The device of claim 8 wherein said means for biasing includes a spring coupled to said guide plate and to said arm to bias said arm against rotation and gravity movement.

* * * * *